R. A. HEISING.
THERMIONIC VOLTMETER.
APPLICATION FILED JULY 30, 1919.
Reissued Oct. 17, 1922. 15,469.
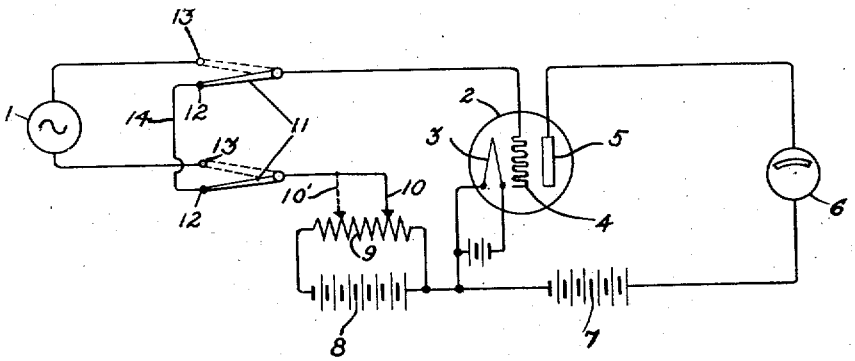
Inventor:
Raymond A. Heising.
by J. G. Robertson Atty.

Reissued Oct. 17, 1922. Re. 15,469

UNITED STATES PATENT OFFICE.

RAYMOND A. HEISING, OF EAST ORANGE, NEW JERSEY, ASSIGNOR, BY MESNE ASSIGNMENTS, TO WESTERN ELECTRIC COMPANY, INCORPORATED, A CORPORATION OF NEW YORK.

THERMIONIC VOLTMETER.

Original No. 1,232,919, dated July 10, 1917, Serial No. 49,253, filed September 7, 1915. Application for reissue filed July 30, 1919. Serial No. 314,384.

*To all whom it may concern:*

Be it known that I, RAYMOND A. HEISING, a citizen of the United States, residing at East Orange, in the county of Essex and State of New Jersey, have invented certain new and useful Improvements in Thermionic Voltmeters, of which the following is a full, clear, concise, and exact description.

This invention relates to apparatus for the measurement of voltage.

Its object is to measure the voltage between two points of an electrical network without taking power from that network and without introducing frequency errors. A further object is to measure a direct or alternating voltage without the necessity for previous calibration of the instrument, which calibration in the case of high frequency measurements is often unsatisfactory and difficult.

These objects are accomplished by connecting the input circuit of a thermionic rectifier between the net work terminals across which the voltage is to be measured, and allowing the resulting rectified current in the output circuit to actuate an indicating instrument.

The nature of this invention and its method of use will be more fully explained in connection with the drawing, which represents the circuit arrangement of the invention.

In the drawing, 1 represents a source of voltage to be measured and 2 is a thermionic rectifier of the audion type upon which is impressed the voltage which it is desired to measure. This rectifier consists of a heated electron-emitting cathode 3, a cool anode 5 and auxiliary electrode 4 usually located between the cathode and the anode. These elements are sealed in a vessel which is exhausted as thoroughly as possible so as to remove practically all the gas. The hot cathode gives off electrons, which, due to the electric field set up between anode and cathode by means of battery 7, are driven across the evacuated space and strike the anode. A current of electrons therefore flows between these two elements and its circuit is completed externally through the battery and the current indicating instrument 6. This circuit is called the output circuit of the rectifier, and since electrons can pass only from cathode 3 to anode 5 and not in the reverse direction, the current in this circuit is always unidirectional and in a direction opposite to that of the electron motion. When a voltage is impressed between the cathode 3 and the auxiliary electrode or grid 4, its effect is to change the number of the electrons passing to anode 5, and, therefore, the intensity of the current in the output circuit; further, if the grid is maintained at a lower potential than the cathode, no electrons can flow to the grid and consequently no current can flow in the input circuit which comprises the electrical path 1, 13 (lower), 10, 3, 4, 13 (upper), 1. Under these conditions the input circuit requires practically no power to produce changes in the output current. To maintain the grid at a potential lower than that of the cahode is one function of the battery 8, which in combination with the resistance 9 and contact maker 10 supplies an adjustable voltage across the input terminals of the rectifier. The intensity of current in the output circuit is determined completely by the voltage impressed upon its input terminals so long as the grid potential is maintained negative; in particular, if the voltage across the input circuit is made sufficiently large, so as to force a sufficiently large negative charge upon the grid 4, the current in the output circuit may be reduced to zero and thus no indication will appear upon the instrument 6.

These facts furnish the basis of a method for measuring an unknown voltage, either alternating or direct, without previous calibration of the instrument in terms of a known voltage of the same type. The method of use for this purpose is as follows: The switch 11 is thrown to the position 12, 12, in which position the input circuit is closed through the conductor 14. The contact 10 is now adjusted until the voltage over the input circuit is just sufficient to reduce the current in the output circuit to zero as indicated by the instrument 6. The switch 11 is next thrown to the position 13, 13, in which position a source 1 of voltage to be measured is connected into the input circuit and its voltage superposed upon that already impressed. If the unknown voltage is an alternating one, it will decrease numerically the resultant negative voltage over the input circuit once every cycle and will, therefore, cause a unidrectional current to flow in the output circuit once every cycle and the average value of this current will be indicated by 6. The contact 10 is now moved to some other position 10′ in which the output current again falls to zero because of the increase in negative voltage impresed from battery 8 in the new position of contact 10. In other words, the increase in voltage impressed from battery 8 is just sufficient to make the resultant maximum negative input voltage the same as in the case when the source 1 was not in circuit. This increase in voltage, measured by the fall of potential over the resistance 9 between the points 10 and 10′, is therefore equal to the maximum value of the alternating voltage to be measured. In the practical use of the device, the resistance 9 should be marked off in terms of the fall of potential along its length as in any potentiometer system of measurement. If a direct voltage is to be measured instead of an alternating one, the only precaution to be observed is that the sign of the direct voltage shall be opposite to that of the voltage impressed upon the input circuit from battery 8.

The particular advantages of this method are that measurements of alternating voltages may be made by a direct current potentiometer method, which is of considerable value in measurements of alternating voltages of high frequency, that the device takes practically no power for its operation, and also that voltages of widely different frequencies may be measured with the same accuracy. This last statement is supported by the fact that thermionic amplifiers have been found to give no noticeable distortion when used in telephony or in radio operation.

What is claimed is:

1. A voltmeter comprising a thermionic rectifier, a current indicating instrument in the output circuit of said rectifier, an adjustable source of electromotive force in the input circuit of said rectifier, and terminals for impressing upon said input circuit a voltage to be measured.

2. In combination, a thermionic rectifier comprising a hot cathode, a cool anode and an auxiliary electrode in an evacuated vessel, a current indicating instrument and a battery connected in series between said anode and said cathode, terminals in the input circuit of said rectifier to which terminals may be applied a voltage to be measured, and an adjustable source of electromotive force connected, in series with said terminals, between said cathode and said auxiliary electrode.

3. A voltmeter comprising a vacuum tube having input and output circuits, a current indicating instrument in the output circuit of said vacuum tube, an adjustable source of electromotive force in the input circuit of said vacuum tube, and terminals for impressing upon said input circuit a voltage to be measured.

4. An electrical measuring instrument comprising a vacuum tube device having a cathode, an anode, a control electrode and a source of space current, means for connecting an electrical source of unknown value to certain of said electrodes, a measuring instrument connected to said device, and means for making the potential of said control electrode such as to reduce the space current between anode and cathode substantially to zero while measurements are being made whereby substantially no power is taken from the unknown source at that time.

5. A voltmeter comprising an electron discharge device having input and output circuits, a current indicating instrument in said output circuit, an adjustable source of electromotive force in said input circuit, and terminals for impressing on one of said circuits an alternating voltage the peak value of which is to be measured.

6. The method of measuring voltage which comprises applying said voltage to a vacuum tube device having a control electrode and an output circuit, applying a known voltage to the control electrode of said device, measuring the combined effect of said voltages in the output circuit of said device, and comparing the values of said known voltage and said effect with a previously determined characteristic of said device.

7. The method of measuring voltage which comprises applying said voltage to a vacuum tube having an output circuit, an input circuit and a plurality of sources of potential, and comparing the voltages necessary in said input circuit to produce the same effect in said output circuit both when the operation of the tube is influenced and when not influenced by the voltage to be measured.

8. The method of measuring voltage which comprises comparing the grid voltages necessary to produce the same effect in the output circuit of a vacuum tube both when the operation of the tube is influenced and when not influenced by the electrical voltage to be measured.

9. The method of measuring voltage which comprises applying said voltage to a vacuum tube device having a cathode, an anode, a control electrode, and a source of space current, and making the potential of said control electrode such as to reduce the space current between said anode and cathode substantially to zero while measurements are being taken.

10. The method of determining the magnitude of a voltage of an alternating current, which comprises applying steady potentials to the input and output circuits of a vacuum tube, noting an electrical effect in said output circuit, applying said alternating current voltage to one of said circuits and comparing an effect produced thereby in said output circuit with said first mentioned effect.

11. The method of determining the magnitude of a voltage of an alternating current, which comprises applying steady potentials to the input and output circuits of a vacuum tube, noting an electrical effect in said output circuit, applying said alternating current voltage to said input circuit and comparing an effect produced thereby in said output circuit with said first mentioned effect.

RAYMOND A. HEISING.